May 2, 1967    E. B. HONEYCUTT ET AL    3,317,351
STABILIZED LOW VOLTAGE ALKALINE PRIMARY CELL
Filed May 14, 1963
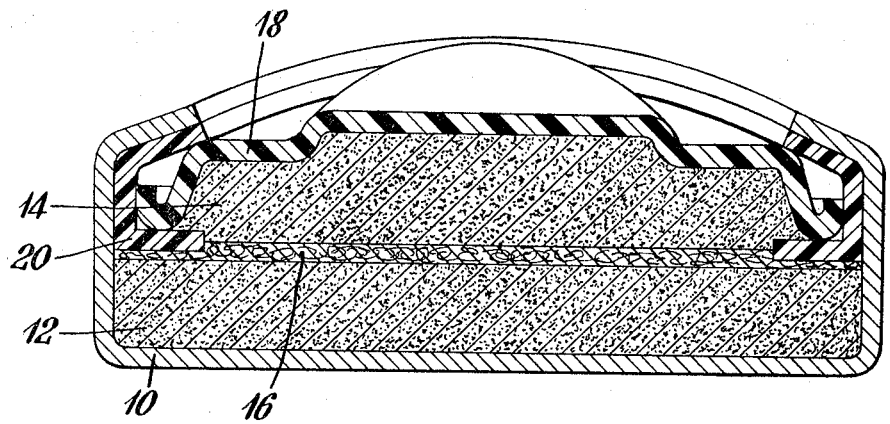
INVENTORS
ERNEST B. HONEYCUTT
HUGH P. KEATING
BY John R. Waherty
ATTORNEY

United States Patent Office 3,317,351
Patented May 2, 1967

3,317,351
STABILIZED LOW VOLTAGE ALKALINE
PRIMARY CELL
Ernest B. Honeycutt, Ramsey, N.J., and Hugh P. Keating, Lakewood, Ohio, assignors to Union Carbide Corporation, a corporation of New York
Filed May 14, 1963, Ser. No. 280,301
7 Claims. (Cl. 136—106)

The present invention relates to primary cells and more particularly to low voltage alkaline primary cells.

With the development of electronic and electrochemical devices such as tunnel diodes and polions, there has emerged a need for batteries having a low voltage which is less than that of conventional batteries presently available. Moreover, it is necessary that these low voltage batteries be capable of providing a relatively uniform discharge curve at the desired voltage level.

One of the primary problems associated with the low voltage system in common use, i.e., mercury batteries, is containment of the discharge by-products. The liquid mercury formed when the cathode material is reduced is difficult to confine to the cathode area. Special precautions are required to prevent the migration of the mercury and cell shorting.

It is a general object of the present invention to provide improvements in the field of primary cells.

More specifically, it is another object to provide a low voltage primary alkaline cell.

It is a further object of the invention to provide a low voltage cell, specifically an alkaline cell, which has been stabilized at an operative voltage level.

It is a still further object to provide a low voltage cell in which the containment problems encountered with prior art low voltage systems are effectively eliminated.

These and other related objects are achieved by the present invention which comprises a cell having an alkaline electrolyte, a zinc anode and a cathode comprising a mixture of a depolarizer compound of cadmium oxide or cadmium hydroxide, cadmium powder and a conductive material such as graphite or nickel powder. The cathode member may have incorporated therein a small amount of electrolyte in order to facilitate molding thereof in any desired shape. The anode and the cathode are separated by an ionically permeable, chemically inert barrier element.

The anode and the electrolyte can conveniently be formed into a single element, i.e., an anode-electrolyte member. Suitably the anode-electrolyte member is formed from a mixture of particles of the anode material, i.e., zinc, combined with an immobilized electrolyte.

The immobilized electrolyte is an aqueous solution of an alkali metal hydroxide to which there is added a compatible gelling agent such as an alkali metal salt of carboxymethyl cellulose, e.g., sodium carboxymethyl cellulose. In general, from about 1 to 3 weight percent of the gelling agent, based on the weight of the anode-electrolyte member is sufficient. The sodium carboxymethyl cellulose is a cellulose derivative which is readily soluble or dispersible in the electrolyte. A suitable quantity of amalgamated zinc powder is added to the electrolyte gel to complete the formulation. It may be desirable to incorporate a quantity of an alkali metal zincate which functions to prevent the formation of gas at the anode.

In addition to the immobilized electrolyte described above, a small quantity of electrolyte is normally added to the ionically permeable separator member which is interposed between the anode-electrolyte member and the cathode.

The use of a combined anode-electrolyte member is particularly adaptable to use in flat type cells. The mixture, while still mobile, may be poured into the cell container or, after setting, appropriate sized slugs may be punched out and inserted into the cell container. In general, the stabilized cathodes of the present invention contain from about 45 to about 95 weight percent of cadmium oxide or cadmium hydroxide, about 1 to 10 weight percent cadmium powder, and from about 4 to about 50 weight percent of some auxiliary conductive material. The auxiliary conductive material can be conveniently selected from such materials as graphite, silver, nickel, iron and like powders. The percentage formulation is based on the weight of the stabilized cathode.

Preferably, the anode-electrolyte member comprises from about 55 to about 70 weight percent zinc powder and about 30 to 35 weight percent potassium hydroxide. The potassium hydroxide is generally of a strength between 6 and 14 normal, i.e., containing from 6 to 14 moles of potassium hydroxide per liter of electrolyte solution. To minimize the presence of corrosion couples within the anode, the zinc is amalgamated with from about 4 to 8 percent mercury based on the weight of the zinc present in the anode.

Early experimentation with zinc-cadmium oxide alkaline cells led to the discovery that such cells exhibited an open circuit voltage which was substantially higher than the theoretical thermodynamic voltage. It was realized that this spurious voltage would have to be eliminated in order to provide a stable discharge curve.

The specific cause or causes of this excess voltage is not completely understood. One possible explanation is that such excess voltage may be caused by oxygen trapped or contained in the cathode materials.

In the present invention, the excess voltage above the theoretical voltage is reduced by the addition of cadmium powder to the cathode of the cell. The presence of cadmium powder effectively removes the high voltage portion of the discharge curve thus stabilizing the cell voltage at a lower operating voltage.

To illustrate one form of the invention, reference is made to the primary flat cell construction in the single figure of the accompanying drawing.

The primary flat cell comprises a shallow circular cup shaped container 10 of steel which serves as the positive terminal. Within the container 10 is the cathode member 12 and an immobilized gelled anode 14 containing the zinc particles and the alkaline electrolyte. The cathode member 12 may be suitably pressed into the bottom of the container 10 under high pressure. Separating the gelled anode 14 and the cathode member 12 is a porous barrier 16. The porous barrier 16 is a chemically inert and ionically permeable material as for example, neoprene, alkali resistant paper, cellophane, nylon, polyvinyl chloride, and the like. A top closure 18 is sealed within the open end of the container 10 by an insulating jacket 20, suitably composed of a plastic such as polyethylene and serves as the negative terminal of the cell.

Four low voltage cells embodying the invention and of a construction similar to that described above were assembled. The composition, in weight percent, of the cells was as follows:

|     | Cathode | Anode-Electrolyte |
| --- | --- | --- |
| I | 89 CdO<br>10 Cd<br>1 KOH (12 N) | 64.1 Zn<br>1.0 Binder<br>32.3 KOH (12 N)<br>2.6 Hg |
| II | 98 CdO<br>1 Cd<br>1 KOH (12 N) | 64.1 Zn<br>1.0 Binder<br>32.3 KOH (12 N)<br>2.6 Hg |
| III | 90 CdO<br>10 Cd | 63.9 Zn<br>2.6 Binder<br>31.0 9 N KOH<br>2.5 Hg |
| IV | 90 CdO<br>5 Cd<br>5 graphite | 63.9 Zn<br>2.6 Binder<br>31.0 9 N KOH<br>2.5 Hg |

The binder was a carboxymethyl cellulose.

Cell number I which had an initial voltage of 0.64 volt was found to have a voltage of 0.46 after a period of 1 month.

Cell number II which had an initial voltage of 1.13 volts had dropped to 0.84 volt after 5 days.

Cells III and IV were found to have voltages of 0.44 after 2 months.

The primary alkaline cell of this invention is characterized by having low operating voltage which is approximately equal to the theoretical voltage. Moreover, the voltage is stabilized at this level in that excess or spurious voltage is eliminated. The nature of the materials is such that problems of containment and cell shorting encountered in other low voltage systems are effectively eliminated.

What is claimed is:

1. In an alkaline primary cell comprising an anode of zinc, an alkaline electrolyte and a cathode composed of a material selected from the group consisting of cadmium oxide and cadmium hydroxide, said cell being normally characterized by having an open circuit voltage which is substantially higher than the theoretical voltage, the addition to said cathode of cadmium metal in an amount sufficient to stabilize the cell voltage at a lower operating voltage approximately equal to said theoretical voltage.

2. The primary cell of claim 1 wherein said anode and electrolyte are embodied within the form of an immobilized anode gel.

3. The primary cell of claim 2 wherein an ionically permeable chemically inert barrier element is interposed between said immobilized anode gel and said cathode.

4. An alkaline primary cell comprising, in combination, an anode-electrolyte member containing an alkali metal hydroxide electrolyte and zinc particles uniformly distributed therein, said electrolyte being gelled and immobilized by a compatible cellulose derivative, a cathode comprising 45 to 95 weight percent of a material selected from the group consisting of cadmium oxide and cadmium hydroxide, 1 to 10 weight percent of cadmium metal and 4 to 50 weight percent of a conductive material, and a chemically inert ionically permeable barrier element interposed between said cathode and said anode-electrolyte member and in contact therebetween.

5. The primary cell of claim 4 wherein said anode-electrolyte member comprises potassium hydroxide containing from 55 to 70 weight percent zinc powder uniformly dispersed therein, said zinc being amalgamated with from 4 to 8 percent of mercury based on the weight of zinc and a sufficient quantity of sodium carboxymethyl cellulose to immobilize the potassium hydroxide.

6. The primary cell of claim 4 wherein said conductive material is graphite.

7. The primary cell of claim 4 wherein said conductive material is nickel powder.

References Cited by the Examiner

UNITED STATES PATENTS

| 2,422,045 | 6/1947 | Ruben | 136—107 |
| 2,980,747 | 4/1961 | Daley | 136—24 X |
| 3,056,849 | 10/1962 | Warren et al. | 136—83 |
| 3,060,254 | 10/1962 | Urry | 136—24 |

WINSTON A. DOUGLAS, *Primary Examiner.*

B. J. OHLENDORF, A. SKAPARS, *Assistant Examiners.*